J. KREMENEZKY & J. JELLINEK.
MACHINE FOR SEALING SUPPORTING WIRES INTO THE BEADS OF GLASS RODS OF METAL FILAMENT ELECTRIC INCANDESCENT LAMPS.
APPLICATION FILED JAN. 26, 1914.
1,117,059.
Patented Nov. 10, 1914.
2 SHEETS—SHEET 1.
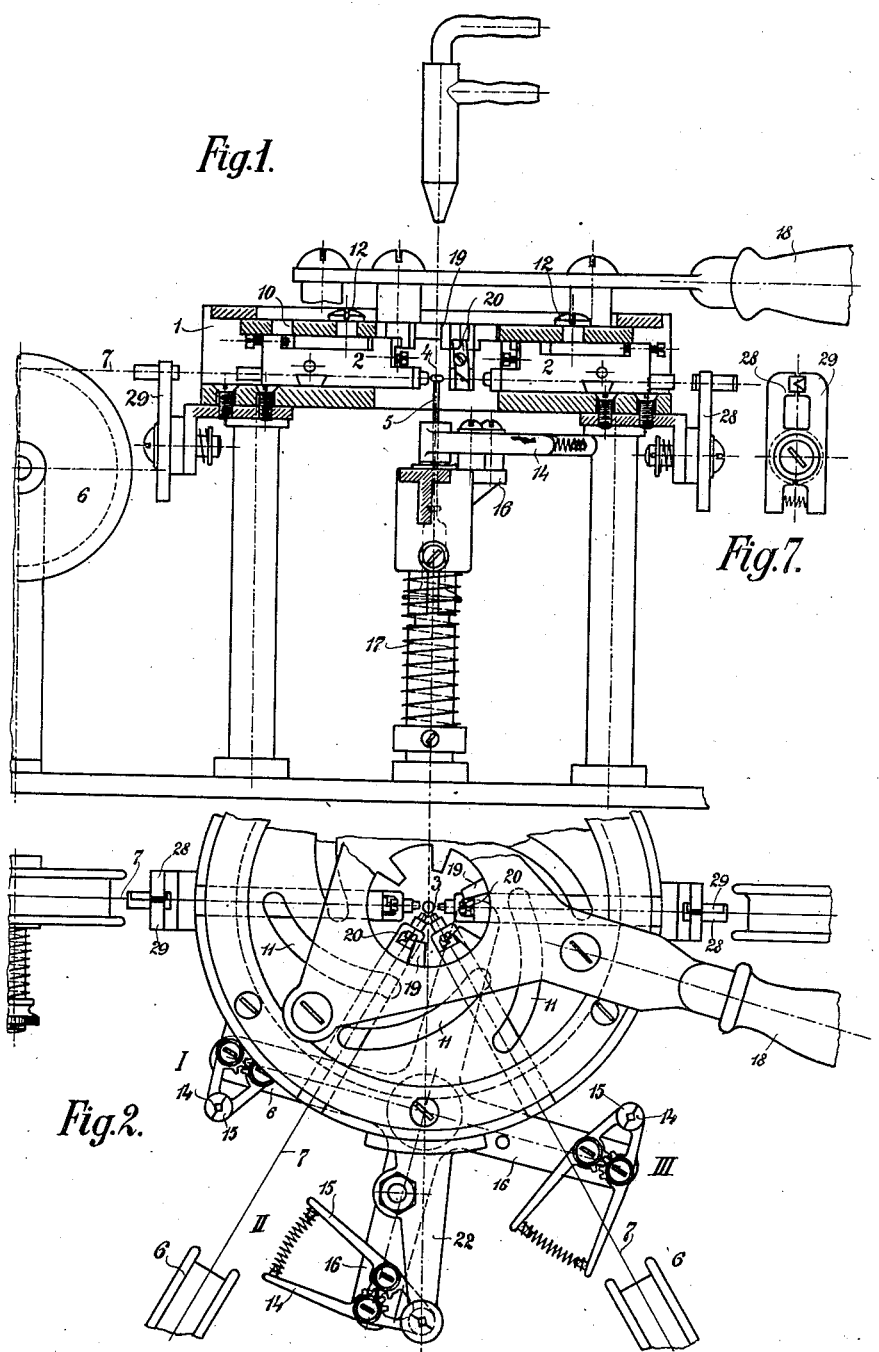

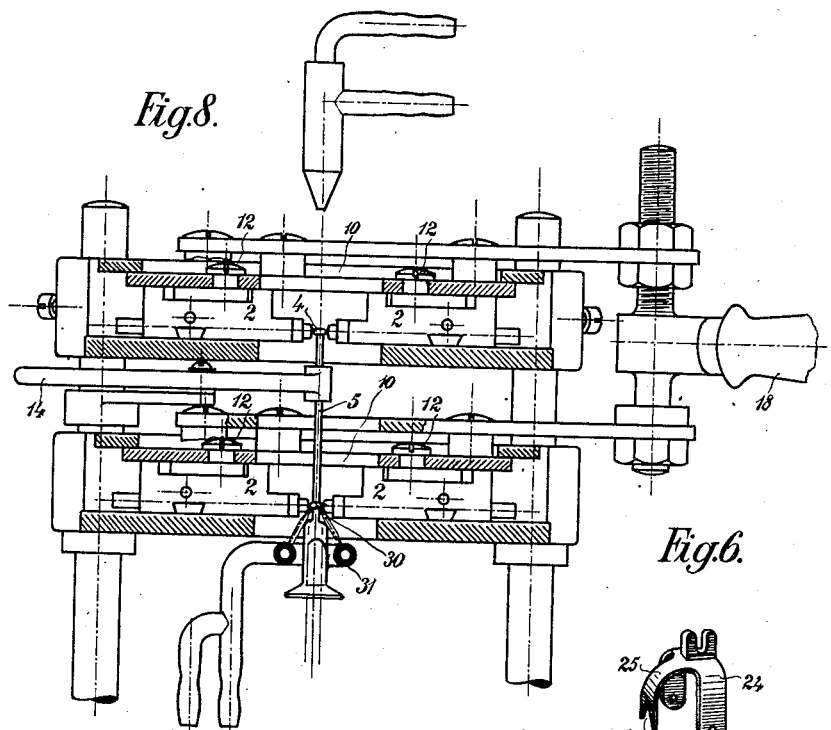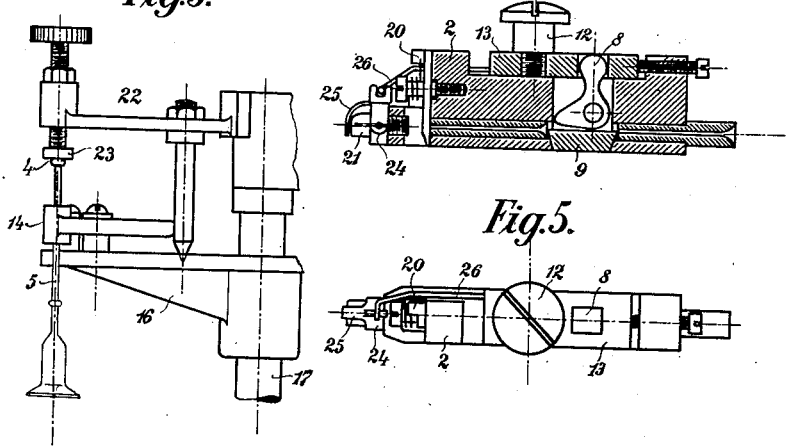

UNITED STATES PATENT OFFICE.

JOHANN KREMENEZKY AND JOSEF JELLINEK, OF VIENNA, AUSTRIA-HUNGARY, ASSIGNORS TO THE FIRM OF JOHANN KREMENEZKY, OF VIENNA, AUSTRIA-HUNGARY.

MACHINE FOR SEALING SUPPORTING-WIRES INTO THE BEADS OF GLASS RODS OF METAL-FILAMENT ELECTRIC INCANDESCENT LAMPS.

1,117,059. Specification of Letters Patent. Patented Nov. 10, 1914.

Application filed January 26, 1914. Serial No. 814,582.

*To all whom it may concern:*

Be it known that we, JOHANN KREMENEZKY and JOSEF JELLINEK, both subjects of the Emperor of Austria-Hungary, and residents of Vienna, Empire of Austria-Hungary, have invented certain new and useful Improvements in Machines for Sealing Supporting-Wires into the Beads of Glass Rods of Metal-Filament Electric Incandescent Lamps; and we do hereby declare the following to be a full, clear, and exact description of the invention, such as will enable others skilled in the art to which it appertains to make and use the same.

Heretofore supporting wires of metal filament electric incandescent lamps were in most cases sealed into the beads of the glass rods by hand. Apart from the fact this requires great skill, more particularly in the case of the fine supporting wires of refractory metals now frequently used, the hand work is open to the serious objection that the supporting wires are exposed to heat for a comparatively long time and therefore are liable to become brittle.

The object of the present invention is to avoid this difficulty by sealing all the supporting wires into the heated bead simultaneously.

The essence of the present invention consists in the feature that slides, one for each supporting wire, are guided radially relatively to the bead and are pushed toward the bead simultaneously by suitable means or mechanism; in this inward movement of the slides the supporting wires passing through them are drawn off supply rolls and advanced toward the bead and the inner ends of such wires projecting from the slides are thrust into the softened bead, whereupon a suitable length of the supporting wires is cut off and the slides are moved back away from the bead into the normal position the supporting wires being released, so that their inner ends again project from the slides and the machine is ready for the next operation. The burner flame or flames heating the bead are preferably reduced immediately before thrusting the supporting wires into the bead so that the wires do not come into contact with the heating flames.

In the drawings Figure 1 shows in vertical section partly in elevation a machine embodying the present invention, Fig. 2 is a plan view thereof, Fig. 3 is a side elevation of the device for bringing the glass into working position, Figs. 4 and 5 show on a larger scale in radial section and in plan view respectively the device for radially advancing the supporting wires, Figs. 6 and 7 show details. Fig. 8 is a vertical section of a modification of the machine shown in Figs. 1, 2 and 3.

In an annular frame 1, Figs. 1 to 5, slides 2 are radially guided, the number of such slides being equal to the number of supporting wires 3 to be sealed into the bead 4 of the glass rod 5 mounted in the axis of the frame. Through each of the slides a length of wire 7 is passed which is drawn off from a supply roll 6 the supporting wires 3 being made of this length of wire 7. The length of wire 7 passes between two clamping jaws 8 and 9 mounted in the slide one of these jaws, namely 8, being movable in the slide and the other being fixed therein.

For operating the slides a disk 10 having an opening in its center is so mounted in the frame that it can be turned to and fro around the axis of the frame. This disk is provided with cam slots 11 into which engage pins 12 on plates 13 engaging with the movable clamping jaws and having a certain play in the slides.

The glass rod 5 provided with the bead 4 and the usual hollow bottom end is inserted into a holder carried by an arm 16 and consisting of two jaws 14, 15 forced against each other by a spring, the insertion being effected while the arm 16 is turned outward around its standard 17, as shown in Fig. 3. Then the holder is turned into the position shown in Figs. 1 and 2 in which the glass rod is in the axis of the frame, and the bead 4 is opposite the slides 2 while the latter are in their normal outermost position as indicated on the right hand side of Fig. 1. Then one or more flames of a burner or burners are caused to act on the bead until this is sufficiently softened. This is preferably done by fully opening the gas supply to the burner or burners automatically by well known means when the holder is moved as above described for bringing the glass rod into the working position. Then the disk 10 is turned by means of the handle 18 in such a direction that the pins 12 are moved toward the axis of the frame by means of the cam slots 11. In the first part of this movement only the plates 13 are shifted by the said pins thereby turning the clamping jaws 8 so that the length of wire 7 passing between it and the fixed jaw 9 is firmly clamped between these jaws, thereafter the slide and the length of wire are moved inward radially, the latter being drawn off the roll 6, until the free end of the wire projecting from the inner end of the slide is thrust into the softened bead (left hand side of Fig. 1). Of course the operation just described takes place with all the slides simultaneously.

Preferably the gas supply to the burner or burners is throttled in the well known manner just before the disk 10 is stopped so that the supporting wires do not enter the flame or flames. In the last part of this movement of the disk, that is to say when the ends of the wires have already been thrust into the bead, projections 19 on the disk strike against and thereby turn knives 20 journaled on the slides 7 whereby the supporting wires are cut off. Now the disk 10 is turned back by the handle 18 whereby in the first instance the knives 20 are caused to return to their normal position and then the plates 13 are shifted by the pins 12 so far that the length of wire in the slides is released. Then the slides begin to move back or away from the glass rod; the lengths of wires passing through them and being released do not partake in this movement but remain stationary while the slides move along the same. When the slides have arrived in their outermost position (indicated at the right hand side of Fig. 1) the inner ends of the wires 7 project from the inner ends of the slides. The glass rod with the bead into which all the supporting wires have been sealed and cut to the proper length is removed from the annular frame 1 by depressing the holder and turning it around the standard 17, whereupon this glass rod is taken out of the holder and a fresh one is inserted into the latter and operated upon as above described.

For securely guiding the length of wires 7 in the slide the inner end of the latter is provided with a nozzle-like projection 21 the outer end of which next to the knife 20 is conically enlarged, whereby the inner ends of the wires 7 after cutting off the ends sealed into the bead are caused to properly enter the nozzle like projections being held in the proper position by the latter.

Preferably a plurality of arms 16 with holders is mounted on the standard 17 as shown in Fig. 2.

After the supporting wires 3 have been sealed into a bead the star formed by the arms 16 is lowered on the standard 17 and is then turned by hand for bringing the finished glass rod into the position I Fig. 2 for permitting it to cool. At the same time another arm of the star comes into the position III and the next following into the position in which the glass rod carried by it is in the axis of the annular frame. The finished glass rod is taken out of the arm 16 in position II and replaced by a fresh one so that the bead 4 of the latter strikes against an adjustable projection 22 of the frame 1 for correctly adjusting the said bead. The bead of the glass rod on the arm 16 in the position III preferably undergoes a preparatory heating by suitably arranged burners while supporting wires are sealed into the bead of the rod in the working position as above described. After finishing this, the star is again lowered and turned through the distance between two neighboring arms and then raised so that the glass rod the bead of which has undergone a preparatory heating comes into working position whereas the finished rod is taken out of the arm now occupying the position II and replaced by a fresh one. In this way not only a correct adjustment of the glass rods but also a notable increase of the output of the machine is secured, because the time required for softening the already heated beads and which is sufficient for taking out the finished glass rod and inserting a fresh one is utilized for performing these last named operations and is considerably reduced by the preparatory heating of the bead.

To the nozzle like projection of each slide preferably a yoke 24 provided with an overhanging arm 25 is pivoted and a rod 26 secured to the plate 13 engages with the said yoke.

In the first part of the inward movement of the plate 13, in which this plate owing to its play in the slide is shifted relatively to the latter, the yoke 24 is turned by the rod 26 in such a manner that a notch 27 (Fig. 6) in the overhanging arm 25 comes close up to the opening in the nozzle like projection 21 of the slide 2 and thus exactly guides and efficiently sustains the end of wire being thrust into the bead. By this yoke any tendency of the wire to bend on being thrust into the bead is efficiently prevented. In the first part of the return or outward movement of the slides 2 the yokes 24 are turned upward owing to the play of the plates 13 in the said slides, so that they do not interfere with the passage of the supporting wire through the nozzle like projections of the slides.

The wire 7 drawn off the roll 6 is preferably caused to pass between two straightening jaws 28 and 29 Figs. 1 and 7 pressed one against the other by springs and mounted in the frame 1 whereby the wire is perfectly straightened.

The machine above described may be so constructed as to seal the supporting wires into two or more beads of the glass rod as shown in Fig. 8. For this purpose two or more sets of radially movable slides 2 are arranged the one above the other and reciprocated by one handle 18. In this case each set of slides is preferably operated by a separate disk 10 as shown in Fig. 8 provided with cam slots in the same way as above described with reference to Figs. 1 and 2. Further it is advisable in this case to mount the burners for heating the beads in the holders for holding the glass rods in working position or, if there be only two beads on the glass rod, to provide for the bottom bead 30 a stationary annular burner 31 through which the glass rod is passed on being raised into working position and on being lowered, as is indicated in Fig. 8. The gas supply to this annular burner 31 may be opened and throttled automatically on raising the glass rod into working position and on lowering the same respectively.

The construction and arrangement of the slides is the same as above described with reference to Figs. 1 and 2. The slides of both sets are arranged in different radial planes if the supporting wires of the different beads are also arranged in different planes. The stroke of the slides of the different sets may be varied by properly selecting the cam slots in the different disks 10 if it is desired that the supporting wires of the different beads of the rod are of different lengths.

The slides may be reciprocated radially by other means instead of disks with cam slots.

The present machine is quick, cheap and regular in operation and prevents the supporting wires from becoming brittle.

Claims:

1. In a machine for sealing supporting wires into the beads of the glass rods of metal filament electric incandescent lamps the combination of an annular frame, means for holding a glass rod in the axis of such frame with its beads at predetermined levels, means for heating such beads, radial guides in the annular frame, slides adapted to move in such guides, means for reciprocating such slides in the said guides simultaneously, a passage way in each slide adapted to guide a wire, clamping means mounted in such passage ways and adapted to grip and release such wire, means for alternately opening and closing such clamping means on the said wires, supply rolls adapted to hold such wires located at the outside of the annular frame and means for cutting off predetermined lengths of such wires from the inner ends thereof.

2. In a machine for sealing supporting wires into the beads of the glass rods of metal filament electric incandescent lamps the combination of an annular frame, means for holding a glass rod in the axis of such frame with its beads at predetermined levels, means for heating such beads, radial guides in the annular frame, slides adapted to move in such guides, plates, one for each slide, adapted to slide radially on such slides, and having radial play in such slides, means for reciprocating such slides in the said guides simultaneously such means being connected to the said plates, a passage way in each slide adapted to guide a wire, a fixed clamping jaw mounted in each slide, a movable clamping jaw mounted in each slide and connected with the said plate on such slide, supply rolls adapted to hold such wires located at the outside of the annular frame and means for cutting of predetermined lengths of such wires from the inner ends thereof.

3. In a machine for sealing supporting wires into the beads of the glass rods of metal filament electric incandescent lamps the combination of an annular frame, means for holding a glass rod in the axis of such frame with its beads at predetermined levels, means for heating such beads, radial guides in the annular frame, slides adapted to move in such guides, means for reciprocating such slides in the said guides simultaneously, such means comprising disks parallel to the annular frame and adapted to turn around the axis of the said frame, a passage way in each slide adapted to guide a wire, clamping means mounted in such passage ways and adapted to grip and release such wire, means for alternately opening and closing such clamping means on the said wires, supply rolls adapted to hold such wires located at the outside of the annular frame and means for cutting off predetermined lengths of such wires from the inner ends thereof, such means comprising a knife on each slide and projections on the said disks adapted to engage with the knives of all the slides simultaneously.

4. In a machine for sealing supporting wires into the beads of the glass rods of metal filament electric incandescent lamps the combination of an annular frame means for holding a glass rod in the axis of such frame with its beads at predetermined levels, means for heating such beads, radial guides in the annular frame, slides adapted to move in such guides, plates one for each slide adapted to slide radially on such slides and having radial play in such slides, means for reciprocating such slides in the said guides simultaneously such means being connected to the said plates, a passage way in each slide adapted to guide a wire, a fixed clamping jaw mounted in each slide, a movable clamping jaw mounted in each slide and connected with the said plate on such slide, yokes one for each slide and pivoted to the front end of such slide, a rod connecting such yoke with the said plate an overhanging arm fixed to said yoke and having a notch on its outer end adapted to come close to the inner end of the passage way in the slide, supply rolls adapted to hold such wires located at the outside of the annular frame and means for cutting off predetermined lengths of such wires from the inner ends thereof.

5. In a machine for sealing supporting wires into the beads of the glass rods of metal filament electric incandescent lamps the combination of an annular frame means for holding a glass rod in the axis of such frame with its beads at predetermined levels, such means comprising a star shaped frame consisting of arms each carrying a holder for the glass rod, such star shaped frame being adapted to rotate step by step around a standard and to be moved to and fro along such standard, means for heating such beads, radial guides in the annular frame, slides adapted to move in such guides, means for reciprocating such slides in the said guides simultaneously, a passage way in each slide adapted to guide a wire, clamping means, mounted in such passage ways and adapted to grip and release such wire, means for alternately opening and closing such clamping means on the said wires supply rolls adapted to hold such wires located at the outside of the annular frame and means for cutting off predetermined lengths of such wires from the inner ends thereof.

In testimony whereof, we affix our signatures, in presence of two witnesses.

JOHANN KREMENEZKY.
JOSEF JELLINEK.

Witnesses:
  ARTHUR GANMANN,
  AUGUST FUGGER.